United States Patent Office 3,089,771
Patented May 14, 1963

3,089,771
METHOD OF FEEDING CHICKS
John H. Hopper, Park Forest, Ill., assignor, by mesne assignments, to Armour and Company, Chicago, Ill., a corporation of Delaware
No Drawing. Filed Feb. 16, 1960, Ser. No. 8,935
2 Claims. (Cl. 99—4)

This invention relates to a poultry feed composition, and to a method of feeding chickens, turkeys, and other poultry. The feed composition and method are particularly adapted for the raising of young chickens for the broiler market. However, it is contemplated that the invention can be advantageously employed in connection with laying hens.

For many years there has been a continuing effort by a large number of investigators to develop better methods of raising poultry, and this effort has been particularly devoted to the improvement of feed compositions or rations used for such purpose. A great deal has been learned about the nutritional requirements of poultry, the most desirable protein levels, protein-energy relationships, vitamin and mineral requirements, and other dietary factors. This has led to the scientific formulation of complete poultry rations which can be used in the raising of poultry with quite predictable results in terms of rate of weight gain and feed efficiency. In addition, it has been found that certain substances, such as antibiotics, may act as growth-promotants, although the substances have no food value in themselves, and cannot be classed as vitamins or minerals. While some success has been achieved with the use of certain growth-promotants in poultry feeds, there is a marked need for further work in this area, to the end of raising poultry more efficiently both as to the time required and the amount of feed consumed.

It is therefore a general object of this invention to provide a novel poultry feed which is characterized by the inclusion of a growth promotant substance. Another object relates to the utilization of the novel poultry feed of this invention in the raising of young chickens for the broiler market. Further objects and advantages will be brought out in the following detailed discussion.

This invention is based on the unexpected discovery that guanidine can be employed as a growth-promotant in poultry feeds. This action of guanidine cannot be explained on the basis of present knowledge. Although guanidine contains amino nitrogens, it is not an amino acid, and poultry, as distinguished from ruminants, are not known to be capable of utilizing non-amino acid nitrogen compounds.

In practicing the method of this invention, it is preferred to combine the guanidine with a substantially complete poultry ration. The invention is well adapted for use with the natural-type of complete rations which are widely employed in the United States. Such rations normally contain at least 16% by weight of protein and are composed principally of a cereal grain and a vegetable oil meal. Depending on the age and kinds of fowls being raised, feeds containing higher levels of protein up to 30% can sometimes be used. More specifically, the cereal grain may be alfalfa, barley, corn, oats, milo, rye, wheat, corn or mixtures of such grains, and the vegetable oil meal may be any of the common meals which are obtained after the extraction of the oil from cotton seeds, linseeds, peanuts, sesame seeds, and soybeans. In one preferred embodiment of the present invention, the guanidine is employed as an additive in corn-soybean oil meal rations. It will be understood that such complete rations will also usually contain all other necessary dietary factors, except water, such as at least the minimum established levels of the essential vitamins and minerals. In addition to the starch provided by the grain, a complete ration will also usually contain a small amount of fat, in the form of a solid fat or a vegetable oil.

In practicing the method of this invention it is believed to be unnecessary to incorporate more than 0.5% by weight of guanidine in the poultry feed. The optimum level should fall within the range from 0.01 to 0.5% guanidine by weight. On the basis of present evidence, it is preferred to employ from 0.025 to 0.3% guanidine to accomplish the objects of this invention.

The guanidine can be incorporated in the poultry feed by any suitable procedure, such as dry blending. Since the amount of guanidine to be used is small in relation to the whole body of the feed, it will usually be desirable to first mix the guanidine with a small portion of the feed material, and after it has thoroughly and uniformly distributed through this "premix," the premix can then be blended with the rest of the feed material to produce a final feed of uniform guanidine content. Guanidine itself, and most common commercially available salts thereof, such as the carbonate, hydrochloride, and nitrate salts, are soluble in water. Consequently, the guanidine or the guanidine salt can be dissolved in water, and then the solution mixed with a small quantity of an absorbent feed material, such as soybean oil meal or other oil-free vegetable meal. The premix thus obtained can then be combined with the feed material as already described.

In one preferred embodiment, a feed for chickens under ten weeks of age is prepared by utilizing a complete ration for such chickens which contains from 16 to 22% protein and is composed principally of a cereal grain and a vegetable oil meal. Preferably all or at least the larger portion of the cereal grain is corn, and all or at least the larger portion of the vegetable oil meal is a soybean oil meal. From 0.05 to 0.1% of guanidine is incorporated in this feed material by any of the procedures described above. The resulting poultry feed is then used for feeding chickens under ten weeks of age. Preferably, the feed comprises the principal diet of the chickens, and the feeding is continued on a day-to-day basis. For example, the chickens may be fed the ration continuously from shortly after they are hatched until they reach eight weeks of age, at which time the chickens should be ready for the broiler market. Normally, starting rations will contain more protein than finishing rations. A typical chick starter ration for use from 2 to 4 weeks of age may contain 20% protein, while a chick finishing ration for 4 to 8 weeks of age may contain 18% protein. Similarly, a turkey starter ration for 4 to 8 weeks of age can contain 26% protein, while a turkey finishing ration may only contain 20% protein.

This invention in one of its embodiments is further illustrated by the following specific example.

Example

Poultry feed for practicing the present invention can be prepared by mixing about 70 parts by weight of ground yellow corn with approximately 20 parts by weight of soybean oil meal. There can also be included 3 parts of bone meal, 1 part of limestone, .05 part of manganese sulfate, 0.5 part of iodized salt, and 4 parts of tallow. In addition, there should be included about 0.6 part of a standard vitamin premix, which is designed to supply all the vitamins and minerals in excess of the recommended minimum levels. The complete, natural-type ration thus produced will contain approximately 16% protein. To this feed is then added 0.05% by weight of guanidine hydrochloride, the additive being utilized in the form of a dry powder which is first thoroughly mixed with a small portion of the feed, and the premix there-after combined and blended with the rest of the feed material.

The guanidine-containing poultry feed prepared as just described can then be used in the raising of baby chickens for the broiler market. Specifically, the feed can be given to 1 day old chicks on an ad libitum basis, and the feeding continued on this basis for eight weeks. During this period, the feed will comprise substantially the entire diet of the chicks.

In the foregoing example and elsewhere in the specification, certain statements have been made for the purpose of more clearly illustrating the invention. It will be apparent to those skilled in the art, however, that the invention is not limited to all the details mentioned in the foregoing specification, and it is intended that the scope of this invention shall be primarily defined by the following claims.

I claim:

1. The method of raising chickens for the broiler market, comprising modifying a substantially complete ration for chickens under ten weeks of age by incorporating therein from 0.025 to 0.3% by weight of guanidine based on the weight of said complete ration, said guanidine being uniformly distributed throughout said ration, said ration containing at least 16% by weight of protein, and feeding said ration to chickens under ten weeks of age, said ration comprising the principal diet of said chickens and said feeding being continued on a day-to-day basis.

2. The method of raising chickens for the broiler market, comprising modifying a substantially complete ration for chickens under eight weeks of age by incorporating therein from .025 to 0.3% by weight of guanidine based on the weight of said complete ration, said ration being principally composed of a cereal grain and a vegetable oil meal, said ration containing from 16 to 22% by weight of protein, and feeding the guanidine-containing ration to chickens under eight weeks of age, said guanidine-containing ration comprising the principal diet of said chickens and said feeding being continued on a day-to-day basis for a plurality of weeks.

References Cited in the file of this patent

UNITED STATES PATENTS 2,630,386    Walker    Mar. 3, 1953
2,890,980    Hotchkiss    June 16, 1959

OTHER REFERENCES

Belasco, Jr. of Animal Science, 13, August 1954, pp. 605–6.